Figure 1:
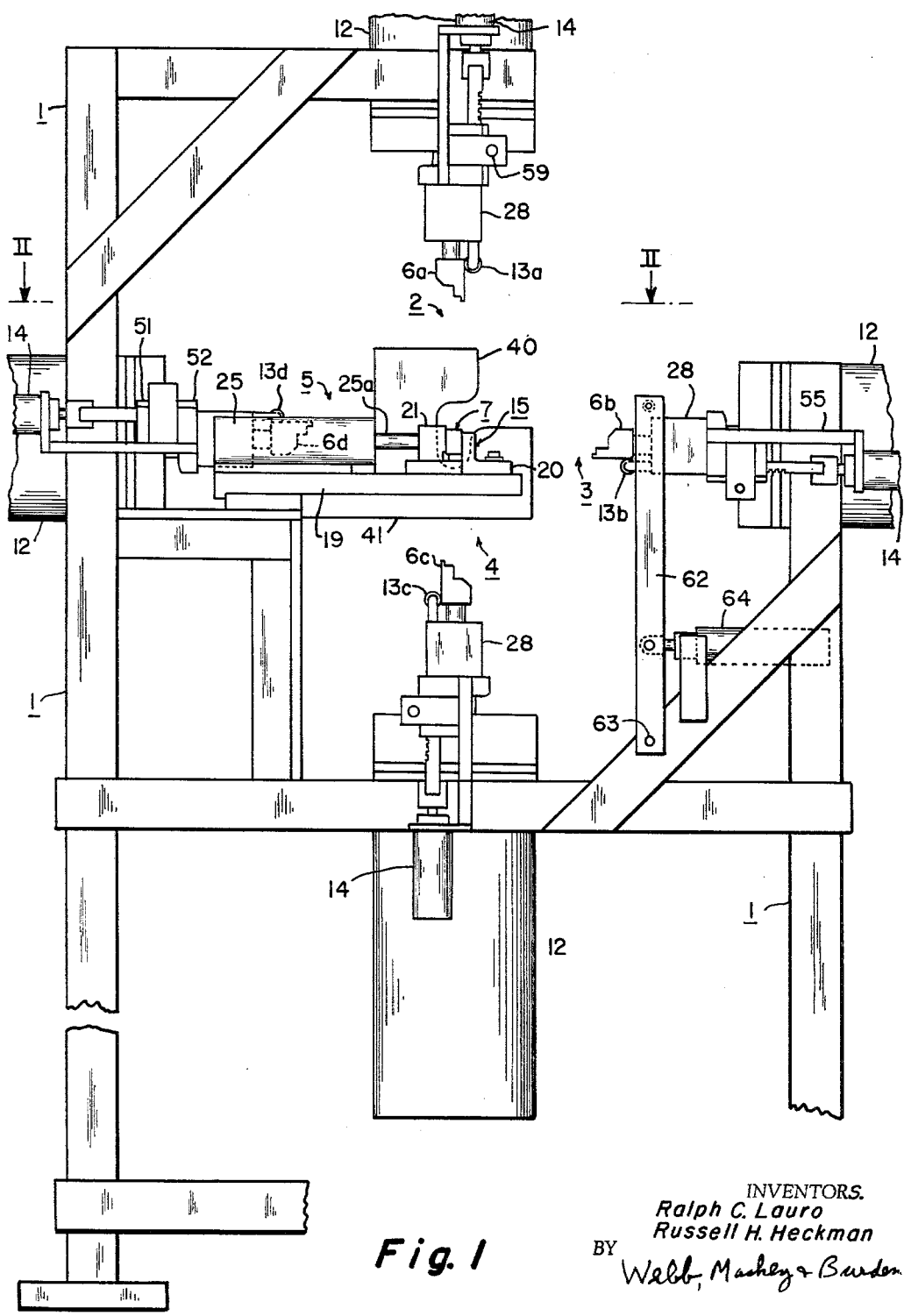

INVENTORS.
Ralph C. Lauro
Russell H. Heckman

THEIR ATTORNEYS

INVENTORS.
Ralph C. Lauro
Russell H. Heckman
BY Webb, Mackay & Burden
THEIR ATTORNEYS INVENTORS
Ralph C. Lauro
Russell H. Heckman
BY Webb, Mackey & Burden
THEIR ATTORNEYS INVENTORS.
Ralph C. Lauro
Russell H. Heckman
BY Webb, Mackey & Burden
THEIR ATTORNEYS

United States Patent Office

3,230,133
Patented Jan. 18, 1966

3,230,133
APPARATUS FOR WRAPPING A SHEET OF MATERIAL AROUND AN ELONGATED ARTICLE
Ralph C. Lauro, Pittsburgh, and Russell H. Heckman, Emporium, Pa., assignors to Motor Coils Manufacturing Company, Pittsburgh, Pa., a corporation of Pennsylvania
Filed July 13, 1962, Ser. No. 209,712
12 Claims. (Cl. 156—477)

This invention relates to a machine for wrapping a sheet of material around an elongated article and particularly to a machine which wraps a sheet of electrical insulation material, such as mica, around an electric current carrying conductor. Heretofore, electrical conductors for armatures, stators or field poles of electric motors have been wrapped with sheets of mica or other suitable electrical insulation material by hand. Most of these conductors have had at least two and three turns of the mica sheet wrapped therearound which sheet is conventionally 6″ to 60″ long and 2″ to 20″ wide cross-sectionwise, and the conductors are usually square or rectangular in shape and accordingly have four corners around which the mica is wrapped.

Since the conductors have been wrapped by hand, the cost of insulating them has been high due to labor requirements and tightness of wrap has been poor whereby the conductors have taken up excessive room when installed upon an armature or field pole. Additionally, when hand-wrapping, there is a likelihood of exerting non-uniform tension longitudinally of the sheet, thereby producing wrinkles which generate cracks in the sheet and thereby effect a loss of electrical insulation property therein. In light of the above, ability to quickly, efficiently and tightly wrap these conductors while maintaining the sheet under uniform tension and keeping labor costs low has been a long, unsolved problem.

Our invention in apparatus for wrapping a sheet of electrical insulation material such as mica around an electrical conductor effects a tight wrap efficiently, quickly and at low cost. Specifically, our invention in the apparatus for wrapping the sheet of material around a conductor comprises a plurality of wrapper bars arranged so that one is substantially opposite each side of the conductor which is supported in the machine in a position for wrapping. Each wrapper bar extends substantially parallel to the longitudinal axis of the conductor, is movable into and out of engagement with one of its side of the conductor and of the sheet lying over its side of the conductor. Additionally, each wrapper bar has a sheet folding lip which forms with that surface thereof opposite its side of the conductor a sheet folding guide for folding the sheet around a corner of the conductor in the direction of wrapping. This guide is substantially in alignment with the corner of the conductor and the lip extends along a portion of the sheet folded around the corner when the wrapping bar engages the sheet lying over its side of the conductor.

At least one of the wrapping bars has a sheet holding member which extends substantially parallel to the longitudinal axis of the conductor, is located substantially adjacent an outer surface of the lip and in a plane extending substantially parallel to the lip and is movable from a first position rearwardly of the outer end of the lip to a second position adjacent the next corner of the conductor in the direction of wrapping. At the second position, the sheet holding member is disposed to engage the sheet and hold it in contact with the conductor.

A first motor means connected to the wrapper bars moves them into and out of engagement with the sheet to effect wrapping of the conductor. A second motor means connected to the sheet holding member moves it between the first and second positions.

Connected to the first motor means is a control for regulating operation thereof to move the wrapper bars into engagement with the sheet lying over their respective sides of the conductor sequentially in the direction of wrapping. The control is also connected to the second motor means for regulating operation thereof to move the sheet holding member from the first position to the second position after its wrapper bar has moved into engagement with the sheet and to withdraw this sheet holding member from the second position just before the next wrapper bar in the direction of wrapping engages the sheet. The control so regulates operation of the first motor means that each wrapper bar is maintained in engagement with the sheet at least until after the next succeeding wrapper bar in the direction of wrapping has engaged the sheet lying across its side of the conductor whereupon each said wrapper bar is withdrawn from engagement with the sheet.

Figure 2:
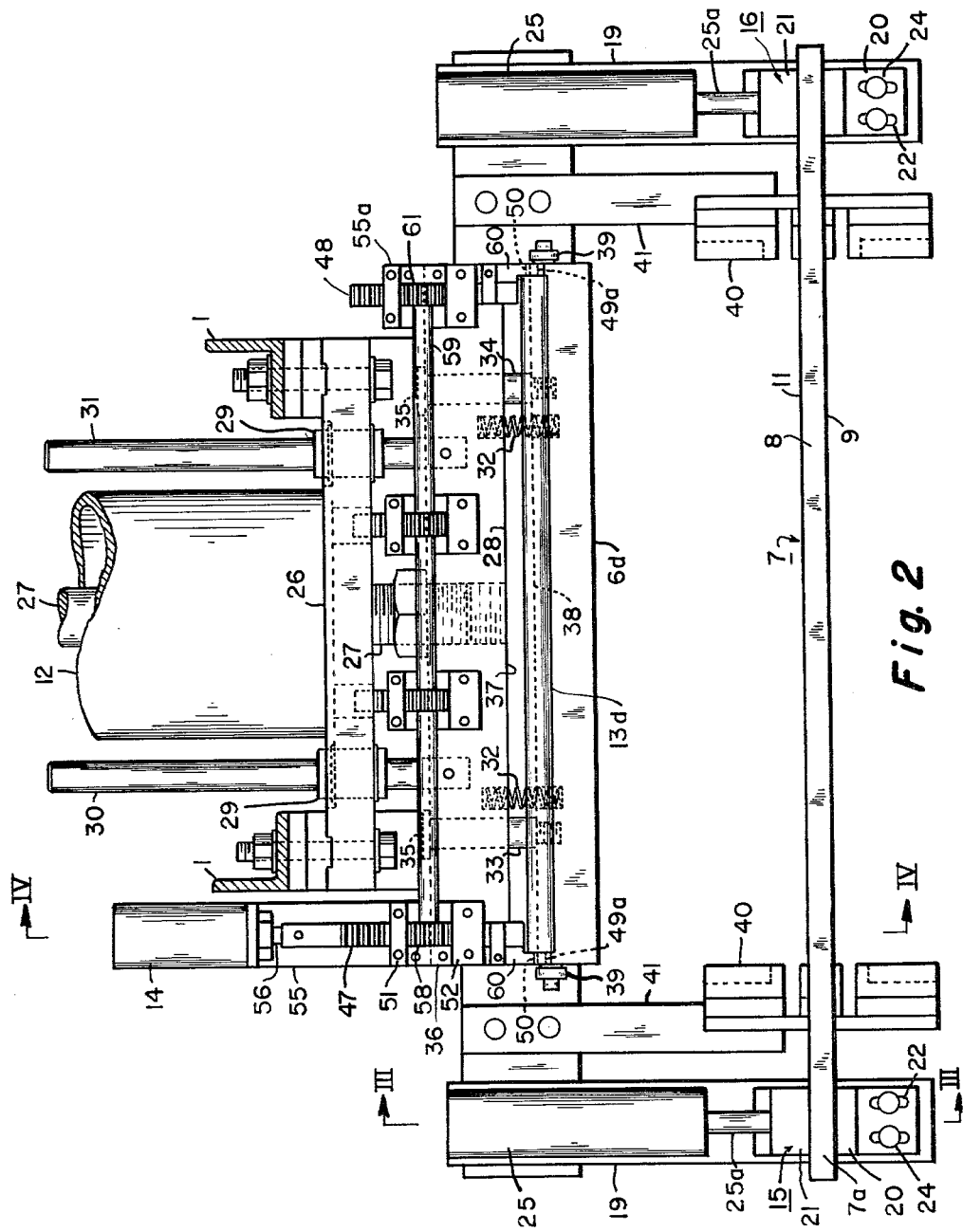
Figure 3:
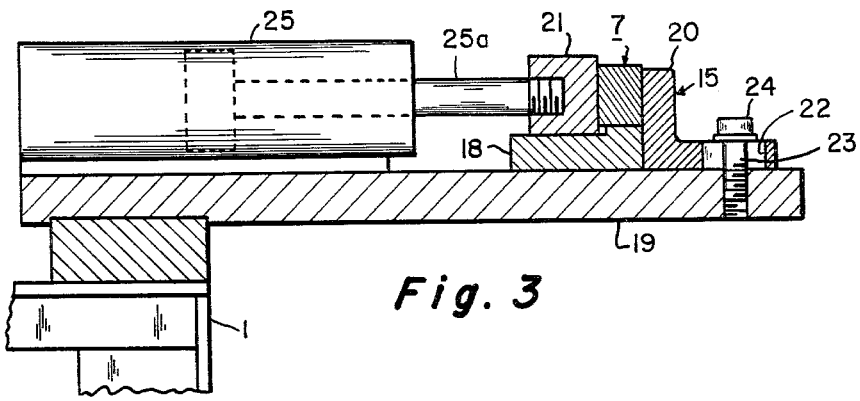
Figure 4:
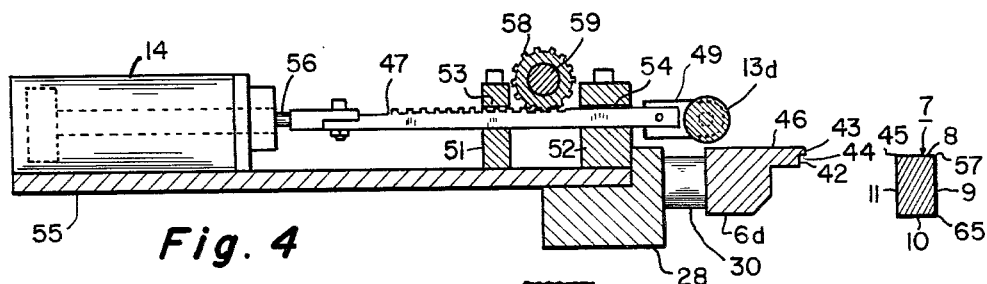
Figure 14:
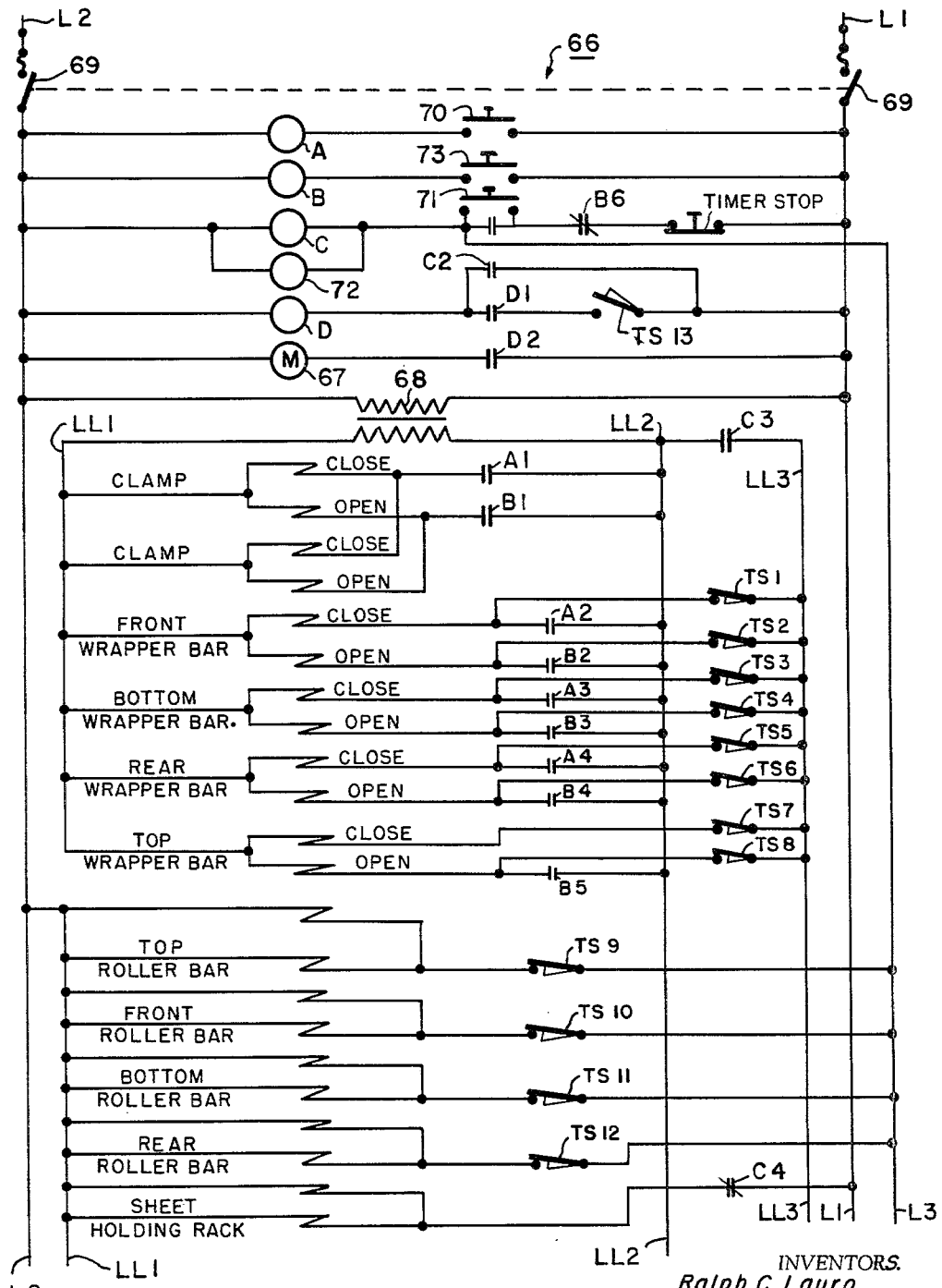

In the accompanying drawings, we have shown a preferred embodiment of our invention in which:

FIGURE 1 is a side elevation view of our apparatus;
FIGURE 2 is a plan view along the line II—II of FIGURE 1;
FIGURE 3 is a section view along the line III—III of FIGURE 2;
FIGURE 4 is a section view along the line IV—IV of FIGURE 2;
FIGURES 5–13 inclusive are fragmentary views of a conductor and wrapping bars and roller bars of the apparatus of FIGURE 1 showing a sequence of operations for wrapping of a sheet of mica around the conductor; and
FIGURE 14 is a schematic wiring diagram of a control which provides automatic operation for the apparatus of FIGURE 1.

Figure 5:
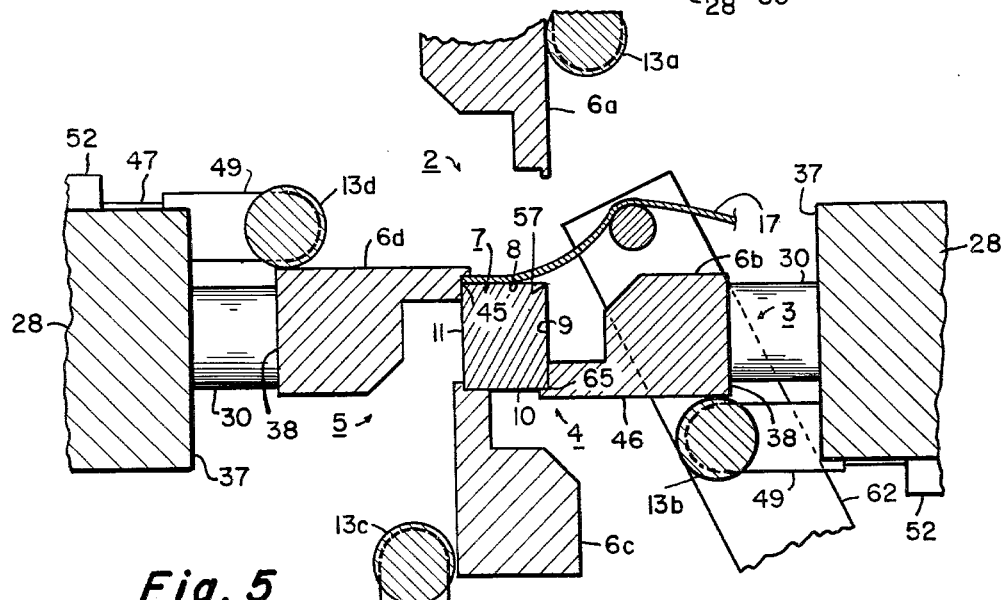
Figures 6, 7, 8:
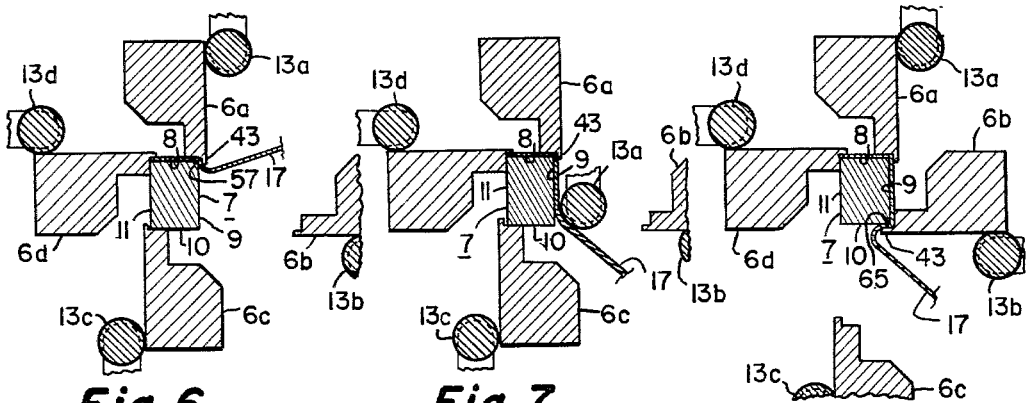

Referring to FIGURES 1 and 5–13, our apparatus comprises a frame 1 made from angle bars and providing four stations 2, 3, 4 and 5 at each of which is located a wrapper bar 6 disposed substantially opposite one side of a conductor 7, rectangular shaped in cross section. The four stations are a top one 2 located directly over the upper side 8 of the conductor and at which is a top wrapper bar 6a, a front one 3 opposite the front side 9 of the conductor and at which is a front wrapper bar 6b, a bottom one 4 opposite the bottom side 10 of the conductor and at which is a bottom wrapper bar 6c, and a rear one 5 opposite the rear side 11 of the conductor and at which is a rear wrapper bar 6d. A first pneumatic cylinder motor 12, one connected to each wrapper bar, moves its wrapper bar into engagement with that side of the conductor or with a sheet of mica 17 lying across that side of the conductor, opposite which its wrapper bar is located. In combination with each wrapper bar is a sheet holding member, shown as a roller bar 13, for holding the mica sheet in position along the side of the conductor being wrapped until just before the next wrapper bar in the direction of wrapping advances to engage the sheet and fold it around the next corner of the conductor in the direction of wrapping (FIGURES 6–7). The roller bars comprise a top one 13a, a front one 13b, a bottom one 13c, and a rear one 13d. Each roller bar has a second pneumatic cylinder motor 14 (smaller than the first one) for moving it between two positions to be described hereinafter.

As shown in FIGURES 2 and 3, two clamps 15 and 16, affixed to the frame, support and grip the conductor 7 in a horizontal position centrally located among the four stations for wrapping it with mica sheet 17 which is precut to a given length. Each end of the conductor rests upon a block 18 affixed to a bracket arm 19 which, in turn, is joined to the frame 1. Referring to FIGURE 3, the bracket arm 19 mounts the clamp 15 which comprises a fixed jaw 20 and a movable jaw 21 which engage therebetween an end 7a of the conductor 7. The fixed jaw 20 has an elongated slot 22 through which extends a bolt 23 whereby it is adjustable to a given location along the bracket arm 19 by tightening of a cap 24. The movable jaw 21 has a connection with a third pneumatic cylinder motor 25 through a piston rod 25a thereof and travels into and out of engagement with the end of the conductor upon operation of same, one of which is provided for each clamp.

Each wrapper bar and its roller bar at each station are the same and accordingly, a description of one wrapper bar 6d and its roller bar 13d is applicable to all. As shown in FIGURE 2, rigidly secured to the frame 1 is a plate 26 which mounts the first pneumatic cylinder motor 12 whose piston rod 27 is connected to a crosshead 28 which, in turn, carries the rear wrapper bar 6d. Extending through bushings 29 in the plate 26 are two guide rods 30 and 31 which are connected at one end to the crosshead 28 and assist to maintain the crosshead and its wrapper bar in alignment during travel of the bar into and out of engagement with the conductor 7 or the sheet 17 of mica lying across that side of the conductor opposite the wrapper bar 6d.

A spring mounting comprising a plurality of coil springs 32 seated at one end in the crosshead 28 and at the other end in the wrapper bar 6d in receptacles and two slide pins 33 and 34 having one end connected to the wrapper bar 6d and having a head 35 at the other end in engagement with the side 36 of the crosshead opposite the plate 26 provide an attachment of the wrapper bar to the crosshead. This attachment spaces the wrapper bar 6d apart from the crosshead when the bar is out of engagement with the conductor and in its open position (FIGURE 1) and provides a spring-loaded engagement by the bar with the conductor or the sheet of mica upon the conductor. When the wrapper bar contacts the conductor or the sheet of mica at its closed position (FIGURE 12) upon advancement of the crosshead, the springs compress and the crosshead continues to advance towards the bar and along the slide pins until its leading end 37 hits the rear end 38 of the wrapper bar at which position the piston of the cylinder motor 12 is at the end of its stroke and advancement of the crosshead terminates.

On each side of the wrapper bar 6d is a guide roller 39 positioned to run along a rail which is a part of a guide member 40 affixed to a brace 41 connected to the frame and located adjacent each end portion of the conductor 7 when it is supported in wrapping position (FIGURES 1 and 2) upon the apparatus. This guide roller and guide member provide alignment for the wrapper bar in travel into engagement with the conductor or a sheet of mica lying across rear surface 11.

Figures 12, 13:
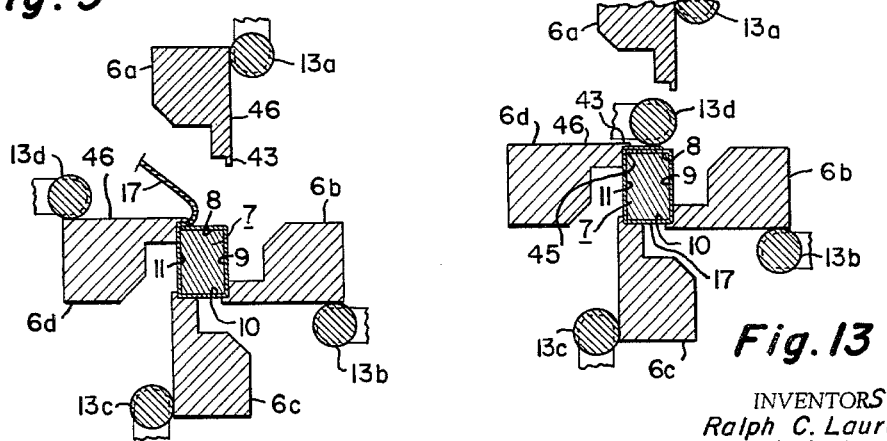

As shown in FIGURES 1, 4 and 12, the wrapper bar 6d extends substantially parallel to the longitudinal axis of the conductor and has a leading surface 42 disposed opposite the rear side 11 of the conductor and a sheet folding lip 43. This lip projects beyond the leading surface 42 and is substantially perpendicular thereto so that it forms with the leading surface a sheet folding guide 44 which folds the sheet around the rear corner 45 of the conductor in the direction of wrapping upon travel of the wrapper bar 6d into engagement with the sheet 17. FIGURE 12 shows that the sheet folding guide 44 is substantially in alignment with the rear corner 45 of the conductor 7. When the wrapping bar 6d engages the sheet 17, its lip 43 extends along a portion of the sheet folded around the corner 45 and thereby assists to hold the sheet 17 against the top side 8 of the conductor and especially that part folded around the corner 45.

In combination with the wrapping bar 6d is the roller bar 13d which also is substantially parallel to the longitudinal axis of the conductor and is located adjacent an outer side 46 of the lip and in a plane extending substantially parallel to the lip 43. Two spaced apart elongated racks 47 and 48 (FIGURES 2 and 4) each have at one end a mounting block 49 with a bearing 49a which receives a spindle 50, one at each end of the roller bar, to provide a rotatable mounting for the roller bar upon the racks 47 and 48. Each rack is supported by two spaced apart posts 51 and 52 through which it slides in bores 53 and 54 and which are attached to a mounting arm 55 affixed to the crosshead 28 and extending in the plane of same. Connected to the other end of rack 47 is a piston rod 56 of the pneumatic cylinder motor 14 which moves the roller bar 13d from a first position where it is rearwardly of the outer end of the lip (FIGURE 1) to a second position (FIGURE 13) where it is adjacent the next corner of the conductor in the direction of wrapping, the front corner 57. In this second position, the roller bar is in contact with the sheet and holds it against the top side 8 of the conductor. Additionally, the roller bar 13d in its travel from its first position to its second position engages the sheet 17 just beyond the outer end of the lip 43 of the top wrapper bar 6d and continues in engagement therewith until it reaches its second position. While in engagement with the sheet it exerts a uniform tension upon the sheet in the direction of wrapping which uniform tension is applied from one side edge to the other side edge and in this way assists to produce a tight wrap without causing cracks in the sheet.

Disposed between the two posts 51 and 52 on the mounting arm 55 is a pinion 58 keyed to a shaft 59 which extends parallel to the roller bar and is rotatably mounted in bearings 60 and located between the two posts on the other mounting arm 55a. Keyed to the shaft between the two posts on the other mounting arm is a second pinion 61. Pinion 58 engages the teeth of the rack 47 and pinion 61 engages the teeth of its rack 48. Accordingly, movement of the rack 47 by operation of the cylinder motor 14 rotates the pinion 58 which turns the shaft 59 to rotate the pinion 61 and thereby move the other rack 48 so that the roller bar travels between the first and second positions while substantially parallel to the longitudinal axis of the conductor.

As shown in FIGURES 5-13 inclusive, the top wrapper bar 6a has its lip 43 in a vertical plane located on the front side of the apparatus viewing FIGURE 1; the front wrapper bar 6b has its lip 43 in a horizontal plane located on the bottom side of the apparatus; the bottom wrapper bar 6c has its lip 43 in a vertical plane located on the rear side of the apparatus viewing FIGURE 1; and the rear wrapper bar 6d has its lip in a horizontal plane located on the top side of the apparatus.

A sequence of operations (FIGURES 5-13) for wrapping the mica sheet 17 around the conductor 7 commences with placing it in the machine with its ends disposed between the jaws of the clamps 15 and 16 which are then closed. Next, the front, bottom and rear wrapper bars 6b, 6c and 6d are advanced from their open positions into engagement with the front, bottom and rear sides 9, 10 and 11 of the conductor, their closed positions respectively, and a leading end of the mica sheet 17 is laid against the leading surface of the rear wrapper bar 6d with the sheet lying across the top side of the conductor and extending over a sheet support rack 62 (FIGURES 1 and 5). The frame 1 provides a pivot mounting 63 for the sheet support rack which is tilted towards the conductor 7 to a support position (FIGURE 5) above and on the front side thereof by a cylinder motor 64 and is returned to a back position shown in FIGURE 1.

Figures 9, 10, 11:
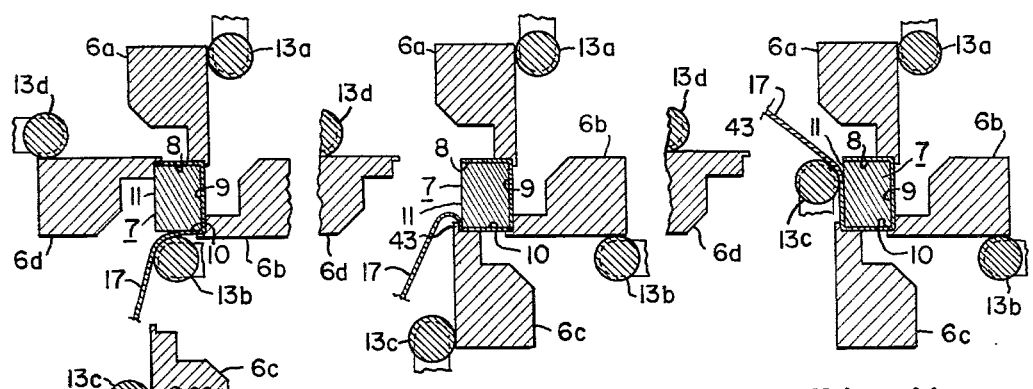

With the mica sheet 17 so positioned, the top wrapper bar 6a advances from its open position (FIGURE 5) into engagement with the sheet, its closed position, and folds same around the front corner 57 in the direction of wrapping after the cylinder motor 64 has returned the sheet support rack to its back position of FIGURE 1. Just before the top wrapper bar 6a engages the sheet, the front wrapper bar 6b moves back to its open position shown in FIGURE 1. Upon engagement of the sheet by the top wrapper bar 6a, the top roller bar 13a then moves from its first position to its second position (FIGURE 7) where it holds the sheet tightly against the front side 9 of the conductor 7. Thereafter, the top roller bar 13a returns to its first position just before the front wrapper bar 6b engages the sheet to fold it around the bottom corner 65 of the conductor. Additionally, prior to arrival of the front wrapper bar 6b into engagement with the sheet, the bottom wrapper bar 6c returns to its open positions as shown in FIGURE 1. Immediately after the front wrapper bar has contacted the sheet, its roller bar 13b advances from its first position to its second position (FIGURE 9).

Following this wrapping of the mica sheet around the top and front sides of the conductor, wrapping proceeds in the same manner around the bottom side 10, rear side 11, top side 8, etc. as described regarding the top and front sides of the conductor until the sheet is completely wrapped around the conductor. This is shown by FIGURES 10–13 and 7–9.

The pistons of the motor cylinders 12 for each of the wrapper bars travels from one end of their stroke to the other end upon operation of one 4-way solenoid valve (not shown) connected to each cylinder and then return to the end of their stroke upon operation of a second 4-way solenoid valve (not shown) connected to each motor cylinder. These 4-way solenoid valves are connected into air lines which supply air under pressure to each of the motor cylinders 12. The piston of each of these cylinders remains at that end of their strike to which they have been moved until one of the two 4-way valves connected to their cylinder operates to send the piston to the other end of their stroke. Thus, there is no operation of any of these pneumatic motor cylinders 12 to return or move a wrapper bar unless one of the 4-way solenoid valves operates to admit air under pressure to its motor cylinder.

Operation of each motor cylinder 14 is under control of a single 4-way solenoid valve (not shown) connected thereto. Upon energization of the valve the roller bar moves by its motor cylinder travels to its second position and upon de-energization, the roller bar returns to its first position.

FIGURE 14 shows schematically a wiring diagram of one control 66 which provides automatic operation of the apparatus of FIGURE 1. This control uses an electric timer motor 67 to rotate a cam shaft (not shown) which mounts 13 cams (not shown) for opening and closing a plurality of time switches TS1–TS13 whereby movement of the wrapper bars and roller bars proceeds sequentially in the direction of wrapping upon carefully regulated short and fast timed intervals.

Referring to FIGURE 14, the control derives electric power from a 110 A.C. source represented by lines L1 and L2 and includes relays A, B, C and D and a low voltage transformer 68 for operating the timer switches. Functioning of the control for operation of the wrapping apparatus commences by closing a main switch 69 and then push button 70 which energizes relay A to close the clamps 15 and 16 and the front, bottom and rear wrapper bars, 6b, 6c and 6d through actuating contacts A1, A2, A3 and A4. Also, normally closed contact C4 in the circuit for the 4-way solenoid valve which regulates operation of the motor cylinder 64 for the sheet support rack 62 opens and effects advancement of the rack to sheet supporting position (FIGURE 5). After the sheet of mica has been positioned as previously described, push button 71 is closed to energize relay C and actuate the timer clutch relay 72, return the sheet support rack to its starting position and energize relay D through contact C2 in its circuit. Relay D now starts the timer motor 67 and closes contact D1 which is a holding circuit for the relay D when the timer motor starts.

Now the timer motor shaft which mounts the cams for regulating operation of the machine starts rotation and closes switch TS7, thereby advancing the top wrapper bar 6a into engagement with the sheet. Before the top wrapper bar engages the sheet, switch TS2 closes to return the front wrapper bar to its open position and then switch TS9 closes to advance the top roller bar 13a from position 1 to position 2 just after engagment of the sheet by the top wrapper bar. Thereafter TS9 opens to return the top roller bar to its first position, followed by closing of switch TS1 to bring the front wrapper bar 6b into engagement with the sheet of mica. Engagement of the sheet by the front wrapper bar occurs just after the top roller bar commences its return to its first position.

Switch TS4 now closes to move the bottom wrapper bar 6c to its open position, FIGURE 1, just before engagement of the sheet by the front wrapper bar 6b. Thereafter switch TS10 closes to advance the front roller bar 13b to its second position in the same timed sequence as described regarding the top roller bar. Then, TS10 opens to return the front roll bar to its first position after which switch TS3 closes to bring the bottom wrapper bar 6c into engagement with the sheet. Prior to contact of the sheet 17 by the bottom wrapper bar, switch TS6 closes to withdraw the rear wrapper bar 6d from engagement with the conductor and then immediately after the contact, switch TS11 closes to advance the bottom roll bar 13c from its first position to its second position, followed by opening of switch TS11 to return the bottom roll bar to its first position. Now switch TS5 closes to bring the rear wrapper bar 6d into engagement with the sheet and switch TS8 closes to move the top wrapper bar 6a to its closed position. Thereafter, switch TS12 closes to advance the rear roll bar 13d from its first position to its second position followed by opening of switch TS12 to return the rear roll bar to its first position. Now switch TS7 closes to advance the top wrapper bar into engagement with the sheet followed by the foregoing sequence of operation until the sheet 17 is completely wrapped around the conductor.

The operator of the apparatus observes wrapping of the conductor until the sheet has been completely wrapped therearound, following which he closes the push button 73 in the circuit of relay B to open the clamp and return the wrapper bars to their starting position as shown in FIGURE 1. This opening of the clamps and return of the wrapper bars result from closing of normally open contacts B1, B2, B3, B4 and B5. Also, relay C is now de-energized and normally closed contact C4 is energized to advance the sheet support rack to its support position.

Switch TS13 may be used to open the D relay to stop the timer motor upon completion of wrapping a sheet of mica around a conductor.

Our apparatus is advantageous for wrapping mica sheet around conductors or sheets of other materials suitable for wrapping around other elongated members or articles in that it has ability to effect a tight wrap quickly and efficiently, particularly with material which is difficult to wrap tightly by hand and is subject to damage from application of non-uniform tension. Additionally, use of our machine materially reduces cost of wrapping mica sheet about conductors especially when used in combination with an automatic control which requires a single operator for the machine.

While we have shown and described a certain preferred embodiment of our invention, it may be otherwise embodied within the scope of the following claims.

We claim:

1. In apparatus for wrapping a sheet of material about at least a portion of the length of an elongated article and about and around successive sides of said article in a direction of wrapping which apparatus has means for supporting said article in a position for wrapping, the invention comprising a plurality of wrapper bars arranged so that one is substantially opposite each side of said article, each wrapper bar extending substantially parallel to the longitudinal axis of said article, being movable into and out of engagement with one of its side of the article and of said sheet lying over its side of the article and having a sheet folding lip which forms with that surface of its bar opposite said side of said article a sheet folding guide of folding said sheet around a corner of said article in the direction of wrapping, said guide being substantially in alignment with said corner of said article, said lip extending along a portion of said sheet folded around said corner when said wrapping bar engages said sheet lying over said side of said article, at least one of said wrapping bars having a sheet holding member extending substantially parallel to the longitudinal axis of said article, being located substantially adjacent an outer surface of said lip and in a plane extending substantially parallel to said lip and being movable from a first position rearwardly of the outer end of said lip to a second position adjacent the next corner of said article in the direction of wrapping, in movement to said second position said sheet holding member being disposed to engage said sheet, first motor means connected to said wrapper bars for moving same into and out of engagement with said sheet to effect wrapping of said article and second motor means connected to said sheet holding member for moving same between said first and second positions.

2. The invention of claim 1 characterized by said wrapper bars comprising top, first lateral, bottom and second lateral wrapper bars, said sheet folding lip of said top wrapper bar forming with said surface thereof substantially opposite a top side of said article a sheet folding guide substantially in alignment with a corner of said article formed by its top side and a first lateral side thereof, said sheet folding lip of said first lateral wrapper bar forming with said surface thereof substantially opposite said first lateral side of said article a sheet folding guide substantially in alignment with a corner of said article formed by said first lateral side and a bottom side thereof, said sheet folding lip of said bottom wrapper bar forming with said surface thereof substantially opposite said bottom surface of said article a sheet folding guide substantially in alignment with a corner of said article formed by said bottom side and a second lateral side thereof, said sheet folding lip of said second lateral wrapper bar forming with said surface thereof substantially opposite said second lateral surface of said article a sheet folding guide substantially in alignment with a corner of said article formed by said second lateral side and said top side thereof, each of said top, first lateral, bottom and second lateral wrapper bars having said wrapper roll.

3. The invention of claim 2 characterized by each wrapper bar having a mounting upon a support member connected to said first motor means, said mounting including spring means which operate in a direction substantially parallel to movement of said wrapper bar relative to said article.

4. The invention of claim 2 characterized by control means connected to said first means for regulating operation thereof to move said wrapper bars into engagement with said sheet lying over their respective sides of said articles sequentially in the direction of wrapping and to remove same from engagement therewith, said control means being connected to said second means for regulating operation thereof to move said sheet holding means from said first position to said second position after its wrapper bar has moved into engagement with said sheet and to withdraw said sheet holding means from said second position just before the next wrapper bar in the direction of wrapping engages said sheet.

5. The invention of claim 4 characterized by said control means so regulating operation of said first means that each said wrapping bar is maintained in engagement with said sheet at least until after the next succeeding wrapper bar in the direction of wrapping has engaged said sheet lying across its side of the article whereupon said wrapping bar is moved out of engagement with said sheet.

6. The invention of claim 1 characterized by control means connected to said first means for regulating operation thereof to move said wrapper bars into engagement with said sheet lying over their respective sides of said article sequentially in the direction of wrapping.

7. The invention of claim 6 characterized by said control means being connected to said second means for regulating operation thereof to move said sheet holding member from said first position to said second position after its wrapper bar has moved into engagement with said sheet and to withdraw said sheet holding member from said second position just before the next wrapper bar in the direction of wrapping engages said sheet.

8. The invention of claim 6 characterized by said control means so regulating operation of said first means that each said wrapping bar is maintained in engagement with said sheet at least until after the next succeeding wrapper bar in the direction of wrapping has engaged said sheet lying across its side of the article at which time each said wrapper bar is moved out of engagement with said sheet.

9. In apparatus for wrapping a sheet of material about at least a portion of the length of an elongated article and about and around successive sides of said article in a direction of wrapping which has means for supporting said article in a position for wrapping, the invention comprising a plurality of wrapper bars arranged so that one is substantially opposite each side of said article, each wrapper bar extending substantially parallel to the longitudinal axis of said article, being movable into and out of engagement with one of its side of the article and of said sheet lying over its side of the article and having a sheet folding lip which forms with that surface of its bar opposite said side of said article a sheet folding guide for folding said sheet around a corner of said article in the direction of wrapping, said guide being substantially in alignment with said corner of said article, said lip extending along a portion of said sheet folded around said corner when said wrapping bar engages said sheet lying over said side of said article, and first means connected to said wrapper bars for moving same into and out of engagement with said sheet to effect wrapping of said article.

10. The invention of claim 9 characterized by control means connected to said first means for regulating operation thereof to move said wrapper bars into engagement with said sheet lying over their respective sides of said article sequentially in the direction of wrapping.

11. The invention of claim 10 characterized by said control means regulating operation of said first means to move a wrapper bar in engagement with said sheet out of engagement with same before the next preceding wrapper bar in the direction of wrapping engages said sheet to place an additional turn of said sheet over that side of said article opposite said wrapper bar in engagement with said sheet.

12. The invention of claim 9 characterized by at least one of said wrapper bars having a sheet holding member extending substantially parallel to the longitudinal axis of said article, being located substantially adjacent an outer surface of said lip and in a plane extending susbtantially parallel to said lip and being movable from a first position rearwardly of the outer end of said lip to a second position adjacent the next corner of said article in the direction of wrapping, in movement to said second position said sheet holding member being disposed to engage said sheet and second means connected to said sheet holding member for moving same between said first and second positions.

References Cited by the Examiner
UNITED STATES PATENTS 1,537,940  5/1925  Ericson _____ 156—480
3,027,292  3/1962  Rothenberger _____ 156—523

FOREIGN PATENTS 198,937  8/1958  Austria.

EARL M. BERGERT, *Primary Examiner.*

UNITED STATES PATENT OFFICE
CERTIFICATE OF CORRECTION

Patent No. 3,230,133  
January 18, 1966

Ralph C. Lauro et al.

It is hereby certified that error appears in the above numbered patent requiring correction and that the said Letters Patent should read as corrected below.

Column 5, line 10, for "positions" read -- position --; line 22, for "travels" read -- travel --; line 25, for "to the end" read -- to the one end --; line 30, for "strike" read -- stroke --; line 41, for "moves" read -- moved --; line 49, for "time switches" read -- timer switches --; column 6, line 47, for "C4 is energized" read -- C4 energized --; column 7, line 5, for "guide of folding" read -- guide for folding --.

Signed and sealed this 6th day of December 1966.

(SEAL)  
Attest:

ERNEST W. SWIDER  
Attesting Officer

EDWARD J. BRENNER  
Commissioner of Patents